US008412631B2

(12) United States Patent
Crofts et al.

(10) Patent No.: US 8,412,631 B2
(45) Date of Patent: Apr. 2, 2013

(54) CLOUD ENABLED PAYMENT PROCESSING SYSTEM AND METHOD

(75) Inventors: Paul M. Crofts, Phoenix, AZ (US); Jeff W. Fromm, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 13/107,069

(22) Filed: May 13, 2011

(65) Prior Publication Data

US 2012/0290478 A1 Nov. 15, 2012

(51) Int. Cl.
*G06Q 40/00* (2012.01)
(52) U.S. Cl. .......................... 705/44; 705/26.1
(58) Field of Classification Search ................. 705/26.1, 705/44
See application file for complete search history.

(56) References Cited

U.S. PATENT DOCUMENTS

| | | | | |
|---|---|---|---|---|
| 7,904,360 B2* | 3/2011 | Evans | | 705/35 |
| 2003/0153278 A1 | 8/2003 | Johnson, Jr. | | |
| 2003/0162565 A1 | 8/2003 | Al-Khaja | | |
| 2005/0222961 A1* | 10/2005 | Staib et al. | | 705/64 |
| 2008/0195536 A1* | 8/2008 | Karns et al. | | 705/39 |
| 2009/0048963 A1 | 2/2009 | Bishop et al. | | |
| 2009/0063312 A1 | 3/2009 | Hurst | | |
| 2009/0171852 A1* | 7/2009 | Taylor et al. | | 705/76 |
| 2009/0204530 A1* | 8/2009 | Hanson | | 705/35 |
| 2010/0114739 A1* | 5/2010 | Johnston | | 705/27 |
| 2011/0035294 A1* | 2/2011 | Mizrah | | 705/26.42 |
| 2011/0165896 A1* | 7/2011 | Stromberg et al. | | 455/466 |
| 2011/0251881 A1* | 10/2011 | Maine | | 705/14.16 |
| 2011/0264571 A1* | 10/2011 | Hadar et al. | | 705/34 |
| 2011/0276496 A1* | 11/2011 | Neville et al. | | 705/75 |
| 2011/0320345 A1* | 12/2011 | Taveau et al. | | 705/39 |
| 2012/0011009 A1* | 1/2012 | Lindsey et al. | | 705/17 |
| 2012/0041879 A1* | 2/2012 | Kim et al. | | 705/44 |
| 2012/0109774 A1* | 5/2012 | Chernenko et al. | | 705/26.4 |
| 2012/0116831 A1* | 5/2012 | Greenspan et al. | | 705/7.22 |
| 2012/0123935 A1* | 5/2012 | Brudnicki et al. | | 705/41 |
| 2012/0123939 A1* | 5/2012 | Diamond | | 705/42 |
| 2012/0124211 A1* | 5/2012 | Kampas et al. | | 709/226 |
| 2012/0130839 A1* | 5/2012 | Koh et al. | | 705/26.1 |
| 2012/0130853 A1* | 5/2012 | Petri et al. | | 705/26.35 |
| 2012/0130856 A1* | 5/2012 | Petri et al. | | 705/26.61 |
| 2012/0143752 A1* | 6/2012 | Wong et al. | | 705/41 |
| 2012/0143767 A1* | 6/2012 | Abadir | | 705/64 |
| 2012/0143772 A1* | 6/2012 | Abadir | | 705/75 |

OTHER PUBLICATIONS

International Search Report and Written Opinion dated Aug. 10, 2012 in Application No. PCT/US2012/037486.

* cited by examiner

*Primary Examiner* — Jagdish Patel
*Assistant Examiner* — Sara C Hamilton
(74) *Attorney, Agent, or Firm* — Snell & Wilmer L.L.P.

(57) ABSTRACT

A comprehensive platform for processing financial transactions is disclosed. The platform is a cloud based and comprises an application programming interface so that application developers can take advantage of the services provided by the framework. The platform replaces many of the expensive, outdated or inefficient aspects of traditional payment processing methods.

25 Claims, 2 Drawing Sheets

CLOUD ENABLED PAYMENT PROCESSING SYSTEM AND METHOD

FIELD OF INVENTIONS

The present disclosure generally relates to enabling services via the cloud, and more particularly, to providing an automated platform to enable financial transactions.

BACKGROUND OF THE INVENTIONS

In major payment networks, payments traditionally begin when a payee (e.g., a merchant) is provided with payment card from a payer (e.g., customer) to satisfy payment for goods or services. In a typical payment transaction, a transaction device is read and an authorization request is sent to a payment network. The network routes an authorization request to the issuer (e.g., a bank) or payment network associated with the card. The issuer approves or declines the transaction and returns an authorization response to the payee via the network. If approved, the payee submits a settlement request to the network for payment. This payment process exists because the payee was typically the only entity that had connectivity to the payment network.

The existing payment process exposes a number of problems for the payer and the payee. Extensive infrastructure is often required to connect every merchant to the payment networks. Also, payment terminals usually require the card or card information to process the transaction. Moreover, mobile devices typically are not configured to communicate directly with terminals. Furthermore, the process is inconvenient and presents constraints to evolving business and transaction modules since payment can only be made to a merchant with a connection to the payment network. Finally, a fraud risk exists because card account details may be stolen and used in fraudulent transactions.

Thus, a long-felt need exists for a financial processing framework that utilizes modern transaction devices (e.g., mobile phones) and enables transaction processing via cloud computing.

SUMMARY OF THE INVENTIONS

Methods and systems provide a novel, cloud-accessible, payment processing framework. In various embodiments, the system provides the ability to submit and receive payments via the Internet using a variety of computing devices and without the need for the connectivity and extra security associated with a traditional payment network.

In an embodiment, a payment processing computer is part of an Internet accessible payment processing cloud. The computer receives a payer request that includes a payer account identifier associated with a first payer. Based upon the payee payment request, the computer generates a cloud transaction identifier and saves to a memory (associated with the payment processing cloud) a first cloud transaction comprising the cloud transaction identifier. The computer sends the cloud transaction identifier to the payer device. The computer receives, from a payee device, a payee payment request comprising the cloud transaction identifier. The computer identifies, based upon the cloud transaction identifier, the first cloud transaction. The computer forms a transaction authorization request and submits it to a payment processing network. The computer receives a transaction authorization from the payment network and sends a first notification message to the payee.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

DETAILED DESCRIPTION

Figure 1:
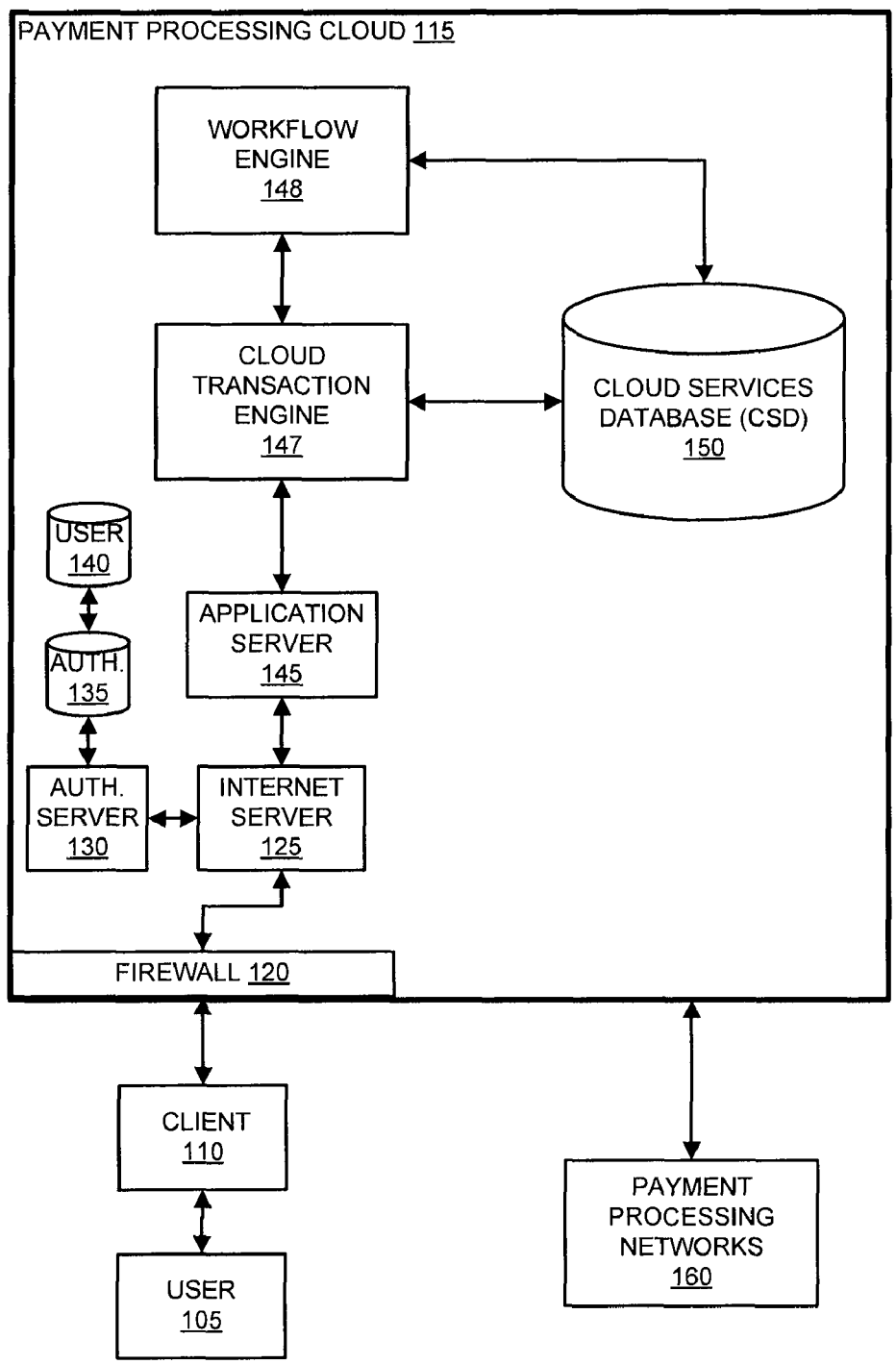
FIG. 1 is a block diagram illustrating major system components for enabling a cloud based payment processing framework, in accordance with an exemplary embodiment.

The systems and methods provide an improved, secure, cloud-enabled transaction processing framework. The framework may be fully or partially standards based and/or API accessible. An embodiment may be implemented by a system, computer readable medium, a method or any combination thereof. The systems and methods include a unique combination of one or more features associated with cloud computing. In one embodiment, the system provides a service oriented framework for managing, processing, tracking, submitting and settling financial transactions.

Exemplary benefits of the system include providing a secure, efficient, device-independent, payment processing framework for financial transactions. Payers, payees and financial account issuers benefit from the framework enabling new transaction models, while eliminating expensive connectivity requirements.

While the embodiments described herein are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In one embodiment, the system includes a user interface (UI), a software module, logic engines, numerous databases and computer networks. While the system may contemplate upgrades or reconfigurations of existing processing systems, changes to existing databases and system tools are not necessarily required by the system and method.

While the description references specific technologies, hardware, equipment, system architectures and data management techniques, practitioners will appreciate that this description is but one embodiment and that other devices and/or methods may be implemented with this disclosure. Similarly, while the description may reference a user interfacing with the system via a personal computer user interface, practitioners will appreciate that other interfaces may include mobile devices, kiosks and handheld devices such as personal digital assistants.

"Entity" may include any individual, consumer, consumer, group, business, organization, government entity, transaction account issuer or processor (e.g., credit, charge, etc), merchant, consortium of merchants, consumer, account holder, charitable organization, software, hardware, and/or any other entity.

An "account", "account number" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. The system may include or interface with any of the foregoing accounts or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

A "transaction account" may include any account that may be used to facilitate a financial transaction. A financial institution or transaction account issuer includes any entity that offers transaction account services to consumers. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution, but these participants are not shown.

A "payment cloud account" includes a user account in a payment cloud that represents a user. The payment cloud account is used to identify a user on the network and may be associated with one or more transaction accounts. In an embodiment, both payer and payee have a payment cloud account. A payment cloud account stores a list of registered accounts that the Payer or Payee can choose to pay with or receive funds into. Payers and payees register with the payment cloud and have payment cloud accounts set up with payment accounts associated with the payment cloud accounts.

A "mobile device" may include, for example, any of mobile telephones, beepers, pagers, iPods®, personal digital assistants (PDAs), Blackberry® type devices and/or any device capable of being moved from one location to another.

"Item" may include any good, service, information, experience, event, show, access, restriction, monetary value, loyalty points, non-monetary value and/or the like.

A "buyer" or "payer" may include any entity that acts in the role of purchaser in a transaction. For example, in order to transfer ownership of a good or to acquire a service a payer incurs a financial obligation to transfer funds to a "payee."

A "financial processor," "payment network," or "payment system" or "transaction account issuer" may include any entity which processes transactions, issues accounts, acquires financial information, settles accounts, conducts dispute resolution regarding accounts, and/or the like.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

With reference now to FIG. 1, an exemplary block diagram illustrating major system components for enabling a payment cloud is presented. In an embodiment, the Internet (or a generalized cloud) facilitates interaction between a user 105 and payment processing cloud ("PPC") 115 through, in one embodiment, client 110 with a network connection to an Internet server 125. In one embodiment, Internet server 125 employs authentication server 130 to validate credentials, assign proper permissions, and retrieve preferences information for authorized user's 105 of PPC 115.

In an embodiment, Internet server 125 employs application server 145 to manage various applications and utilities that are utilized by PPC 115. Application server may utilize APL+ Win, and JBOSS utilizing SEAM, Richfaces JBPM, and other Java libraries (jQuery and Javascript), JAX-WS, Apache POI, and Quartz. Internet server 125 may interact directly with the various systems and components disclosed herein.

PPC 115 comprises a payment processing infrastructure that provides services and/or applications that are accessible from various client devices through a thin client interface such as a web browser. In an embodiment, PPC 115 includes software as a service ("SaaS") where payers and payees may manage user-specific application configuration settings but may not manage or control the underlying cloud infrastructure including network, servers, operating systems, storage, or individual application capabilities. PPC 115 may include any number of computing platforms and databases such as, for example, cloud transaction engine 147, workflow engine 148 and cloud services database ("CSD") 150. PPC 115 may also include, for example, an application programming interface (API), accounting systems, payment system gateways, financial transaction systems, reporting systems, new accounts systems, management information systems, business information systems, external data sources, proprietary systems and the like. Each of the systems may be interconnected within by a network in via any method and/or device described herein. A middleware server and/or application server 145 may serve as an intermediary between the various systems to ensure appropriate communications between disparate platforms. A report engine retrieves and/or is provided with data from certain of the various systems in order to generate notices, bills, contracts, messages, audit reports, and the like.

PPC 115 and/or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. In various embodiments, the payment processing cloud may include the capability to use the applications running on a cloud infrastructure.

As will be appreciated by one of ordinary skill in the art, one or more of the components of PPC 115 may be embodied as a customization of an existing system, an add-on product, upgraded software, a stand alone system (e.g., kiosk), a distributed system, a method, a data processing system, a device for data processing, a computer and/or a computer program product. Accordingly, individual PPC 115 components may take the form of an entirely software embodiment, an entirely hardware embodiment, or an embodiment combining aspects of both software and hardware. In one embodiment, a PPC 115 component (e.g. a computer) may include a processor, a memory, a communications interface, a network interface, etc. Furthermore, individual PPC 115 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like.

PPC 115 contemplates uses in association with web services, transaction processing, utility computing, pervasive and individualized computing, security and identity solutions, autonomic computing, commodity computing, mobility and wireless solutions, open source, biometrics, grid computing and/or mesh computing.

User 105 may include any buyer, seller, individual, customer, group of individuals, charity, cardholder, business, entity, government organization, software and/or hardware that uses, develops and/or maintains PPC 115 or PPC 100 functionality. For example, user 105 may include payers, payers, payment networks, banks, application developers and service providers. In an embodiment, user 105 interacts with PPC 115 via, for example, internet connectivity and from a variety of connected devices (e.g., mobile devices). User 105 may include a payer who uses an account code without any physical card, uses a transponder, and/or uses a physical transaction card, to purchase items. In various embodiments, user 105 may interface with PPC 115 via any communication protocol, device or method discussed herein or known in the art. For example, user 105 may interact with PPC 115 by way of an Internet browser at client 110.

Client 110 comprises any hardware and/or software suitably configured to facilitate requesting, retrieving, updating, analyzing, entering and/or modifying data. For example, in one embodiment, client 110 is configured to run a micro-application or (app) that forms transaction requests and submits the requests to a payment processing cloud. Client 110 includes any device (e.g., personal computer or point-of-service (POS) terminal) which communicates (in any manner discussed herein) with PPC 115 via any network discussed herein. Browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that client 110 may or may not be in direct contact with PPC 115. For example, client 110 may access the services of PPC 115 through another server, which may have a direct or indirect connection to Internet server 125. Client 110 may be mobile or may be located in a home or business environment with access to a network. In an exemplary embodiment, access is through a network or the Internet through a commercially-available web-browser software package.

As those skilled in the art will appreciate, client 110 includes an operating system (e.g., Windows NT, 95/98/2000, OS2, UNIX, Linux, Solaris, MacOS, Android, iPhone OS etc.) as well as various conventional support software and drivers typically associated with computers or computing devices. Client 110 may include any suitable personal computer, mobile device, phone, network computer, workstation, minicomputer, mainframe or the like. Client 110 can be in a home or business environment with access to a network. In an exemplary embodiment, access is through a network or the Internet through a commercially available web-browser software package.

Client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Client 110 may include any number of applications, code modules, cookies, and the like to facilitate interaction with PPC 115 in order to, for example, input data, complete templates/forms, view reports, validate data, approve data, review IP asset info, participate in a negotiation, review due diligence documents, respond to a survey, and the like. In one embodiment, client 110 may store user 105 preferences and/or any other information disclosed herein on a hard drive or any other local memory device. Accordingly, client 110 may retrieve and store information within a memory structure of client 110 in the form of a browser cookie, for example. In another embodiment, client 110 retrieves information relating to user 105 from PPC 115 on establishing a session with Internet server 125.

Firewall 120, as used herein, may comprise any hardware and/or software suitably configured to protect PPC 115 components from users of other networks. Firewall 120 may reside in varying configurations including stateful inspection, proxy based and packet filtering among others. Firewall 120 may be integrated as software within Internet server 125, any other PPC 115 components or may reside within another computing device or may take the form of a standalone hardware component. Although depicted as a single firewall in FIG. 1, one skilled in the art will recognize that a firewall or multiple firewalls may be implemented throughout PPC 115 to enable system and data security.

Internet server 125 may include any hardware and/or software suitably configured to facilitate communications between client 110 and one or more PPC 115 components. Further, Internet server 125 may be configured to transmit data to client 110 within markup language documents (e.g., XML, HTML, etc.). As used herein, "data" may include encompassing information such as commands, queries, files, data for storage, and/or the like in digital or any other form. Internet server 125 may operate as a single entity in a single physical location or as separate computing components located together or in separate physical locations.

Internet server 125 may provide a suitable web site or other Internet-based graphical user interface which is accessible by consumers. In an embodiment, Internet server 125 employs RedHat Linux Enterprise 5.x Server and Apache Http server. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to components of PPC 115, Internet server 125 may invoke authentication server 130 in response to user 105 submissions of authentication credentials received at Internet server 125 from client 110. Authentication server 130 may include any hardware and/or software suitably configured to receive authentication credentials, encrypt and decrypt credentials, authenticate credentials, and grant access rights according to privileges (e.g., pre-defined privileges) attached to the credentials. Authentication server 130 may grant varying degrees of application and data level access to users based on information stored within a database and/or any other known memory structure.

Cloud transaction engine 147 comprises hardware and/or software modules that execute processes, access data from cloud services database ("CSD") 150 and/or interact with workflow engine 148 to enable the functionality of PPC 115. In an embodiment, services provided by cloud transaction engine are accessed via an API.

Workflow engine 148 comprises hardware and/or software modules that implement process definition, tracking and/or execution. Workflow engine 148 may comprise one or more software applications, modules or data objects. The software may be any executable code written in any software programming language, such as, for example Java®. For example, workflow engine 148 reads data from CSD 150 and instantiates a data object (e.g. a Java Bean®) to store the data for use by software modules or other objects. In one embodiment, workflow engine 148 executes an automated or partially automated process such as a price negotiation or an auction. In an embodiment, workflow engine 148 enables users 105 to document a process and track progress toward completion of the process. Workflow engine 145 reads schedules, sends notices and triggers report creation.

CSD 150 may include any hardware and/or software suitably configured to facilitate storing data relating to, for example, financial transactions, transaction audit information, transaction details, transaction messages, transaction settlements, configuration data, geographic and/or location data, tracking and status data, schedules, transactions, statements, amounts owed, payments, authentication credentials, user permissions, payer preferences, payee preferences and/or the like.

One skilled in the art will appreciate that PPC 115 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of PPC 115, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with PPC 115 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of PPC 115, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. PPC 115 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of PPC 115 may consist of any combination thereof at a single location or at multiple locations, wherein each database or PPC 115 includes any of various suitable security features, such as firewalls, access codes, encryption, decryption, compression, decompression, and/or the like.

As used herein, the term "network" shall include any cloud, cloud computing, and/or electronic communications means which incorporates both hardware and software components of such. Communication among the parties may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the disclosure is frequently described herein as being implemented with TCP/IP communications protocols, the disclosure may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

The disclosure may be described herein in terms of functional block components, screen shots, optional selections and various processing steps. It should be appreciated that such functional blocks may be realized by any number of hardware and/or software components configured to perform the specified functions. For example, PPC 115 may employ various integrated circuit components, e.g., memory elements, processing elements, logic elements, look-up tables, and/or the like, which may carry out a variety of functions under the control of one or more microprocessors or other control devices.

Similarly, the software elements of PPC 115 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Software elements (e.g., modules, engines, etc) may be implemented as a web service. In an embodiment, web services are implemented using Webservice Interoperability Organization Basic Profile 1.1. In an embodiment, PPC 115 includes interfaces that are accessible via an API. In one embodiment, the API specifies interfaces that conform to representational state transfer ("REST") constraints.

Further, it should be noted that PPC 115 may employ any number of conventional techniques for data transmission, signaling, data processing, network control, and/or the like. Still further, PPC 115 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (or "computer-readable medium") that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

PPC 115 enables a payer and a payee to execute a financial transaction independent of traditional connectivity and security typically required for credit card payments. PPC 115 combines payment network connectivity, unique standardization, process improvement, workflow, data integration, searching, and data security features to enable a seamless, feature-rich transaction processing services.

Referring again to FIG. 1, in one embodiment, when user 105 logs onto an application, Internet server 125 may invoke an application server 145. Application server 145 may invoke logic in the cloud transaction engine 147 by passing parameters relating to the user's 105 requests for data. PPC 115 manages requests for data from cloud transaction engine 147 and communicates with payment processor networks 160. Transmissions between user 105 and Internet server 125 may pass through a firewall 120 to help ensure the integrity of PPC 115 components. Practitioners will appreciate that the disclosure may incorporate any number of security schemes or none at all. In one embodiment, Internet server 125 receives requests from client 110 and interacts with various other PPC 115 components to perform tasks related to requests from client 110.

Internet server 125 may invoke an authentication server 130 to verify the identity of user 105 and assign roles, access rights and/or permissions to user 105. In order to control access to the application server 145 or any other component of PPC 115, Internet server 125 may invoke an authentication server 130 in response to user 105 submissions of authentication credentials received at Internet server 125. When a request to access PPC 115 is received from Internet server 125, Internet server 125 determines if authentication is required and transmits a prompt to client 110. User 105 enters authentication data at client 110, which transmits the authentication data to Internet server 125. Internet server 125 passes the authentication data to authentication server which queries the user database 140 for corresponding credentials. When user 105 is authenticated, user 105 may access various applications and their corresponding data sources.

PPC 115 enables a cloud enabled, payment processing framework. The processing framework may be service-oriented, API accessible, standards based, and/or workflow driven. PPC 115 partially or fully changes the way a financial transaction is created and processed and allows the payer to have much more control over charges to their account. PPC 115 provides a set of services that exist as Internet services that can be consumed by any entity with Internet connectivity. PPC 115 enables the use of a cloud transaction identifier ("ID") as a payment token. PPC 115 provides the connectivity to the existing payment networks (e.g., American Express, VisaNet and Maestro) to obtain authorization for transactions submitted to PPC 115. In an embodiment, since PPC 115 maintains the connection to the payment networks the payee no longer maintains a direct connection (which often may be expensive to maintain) to the payment networks. PPC 115 handles obtaining an authorization and is configured to communicate both payer and payee information to transaction account issuers. This allows traditional merchants such as grocery stores, large retailers etc., that accept existing payment network cards to transact with new connected devices (e.g., a mobile phone). PPC 115 also allows new merchants and other types of non-traditional payees to accept transaction account payments without the added cost and security requirements associated with the legacy payment processing infrastructure.

In an embodiment, PPC 115 comprises a REST API. The REST API presents an open set of service calls that are used to create and work with transactions on PPC 115. The REST API exposes the services to application developers to develop software components to enable payment cloud transactions including, for example: merchant payee software to interface with existing merchant checkouts; mobile device wallet applications for managing payments on mobile devices; Internet Browser plugins to enable payments from home computers; and/or peer-to-peer mobile payment applications. In an embodiment, software developers register for a developer account and request a developer key for their PPC 115 compliant applications. The developer key is used to sign requests from that software developer's application.

PPC 115 may use the transaction itself to provide the link between payer and payee rather than transaction account (e.g., payment card) details. By using a cloud transaction ID to identify the transaction in PPC 115, payers and payees communicate payment details easily and without exposing the financial payment account directly at the time of payment. In an embodiment, the cloud transaction ID is a single-use ID that only exists in PPC 115 for the duration of a payment transaction. For example, once a transaction has been completed the cloud transaction ID cannot be used again.

Cloud transaction engine 147 may process a variety of different transaction requests and messages. A "PayWith Request" or "payer request" may include a payer's request to EPC 115 to create a transaction in the payment processing cloud. The PayWith Request identifies the payer to the cloud, the payment account and additional meta information about the PayWith request expected by the REST API. In one embodiment, a "ReceiveInto Request" or "payee payment request" comprises the payee's request to EPC 115 to match with the Payer's PayWith request.

Figure 2:
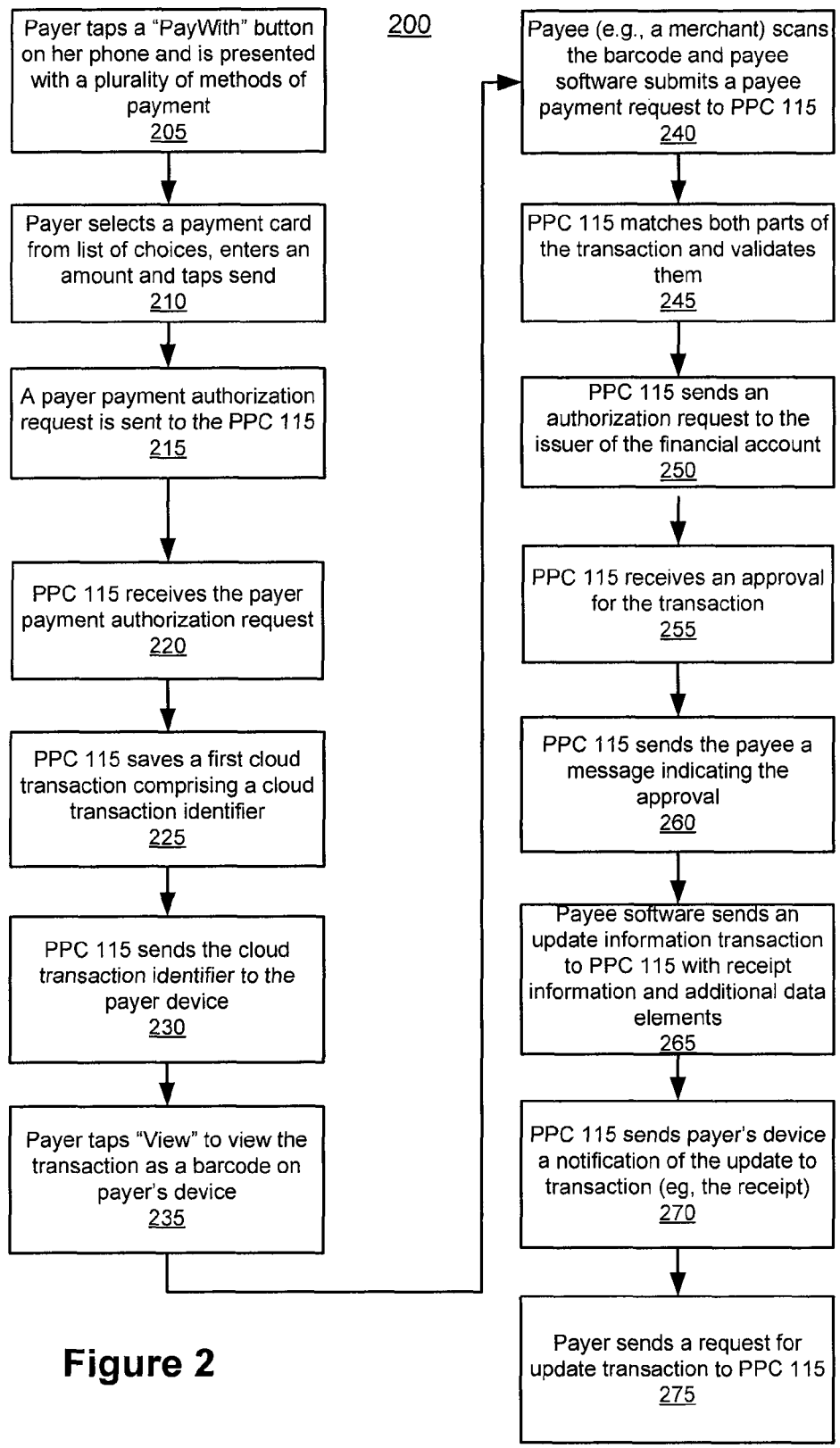
FIG. 2 is a flow chart illustrating an exemplary process for processing a payment authorization, in accordance with an exemplary embodiment.

With reference now to FIG. 2, in an embodiment, an "authorization only" request corresponds to an "auth only" request on traditional payment processing networks and card authorization systems. PPC 115 provides an authorization to the payee. Payer taps a "PayWith" button on her phone and is presented with a plurality of methods of payment (Step 205). Payer selects a payment card from list of choices, enters an amount and taps send (Step 210). A payer request is sent to the PPC 115 (Step 215).

PPC 115 receives the payer request (Step 220). In an embodiment, the payer request and/or the payee payment request (discussed below) may include a cloud account identifier, a payee transaction account identifier, user authentication data, a payment amount, a payment currency, a geographical location, a notification option, and a developers API key. PPC 115 generates a cloud transaction identifier and saves a first cloud transaction comprising the cloud transaction identifier to CSD 150 (Step 225). PPC 115 sends the cloud transaction identifier to the payer device (Step 230).

Payer taps "View" to view the transaction as a barcode on payer's device (Step 235). In an embodiment, the cloud transaction identifier is sent by PPC 115 as a token and payer device converts the token data into a barcode (e.g. a QR Barcode®). In various embodiments, the barcode comprises, for example, a QR Code, a micro QR Code, a matrix bar code, a two-dimensional bar code and/or the like. For more information regarding the use of barcodes to enable mobile transactions, refer to U.S. patent application Ser. No. 13/011,643, entitled "Systems And Methods For Virtual Mobile Transaction," filed on Jan. 21, 2011, which is hereby incorporated by reference in its entirety.

With reference again to FIG. 2, payee (e.g. a merchant) scans the barcode from the payer device and payee software submits a payee payment request to PPC 115 (Step 240). In various embodiments, a payee or payee device may receive the cloud transaction identifier voice, instant message, text message (e.g., SMS or MMS), bar code, email, web post, RFID scan, etc. PPC 115 matches both parts of the transaction and validates them (Step 245). PPC 115 sends an authorization request to the issuer of the financial account (Step 250) that was identified by the payer and receives an approval for the transaction (Step 255). PPC 115 sends the payee a message indicating the approval (Step 260). Payee software sends an update information transaction to PPC 115 with receipt information and additional data elements (Step 265). PPC 115 sends payer's device a notification of the update to transaction (e.g., the receipt) (Step 270). Payer's device is either sent the updated information automatically or payer sends a request for updated transaction to PPC 115 (Step 275).

In an authorization "with tip" transaction, the payer receives a message from PPC 115 enabling the payer to add a tip to be associated with the transaction. The following example, illustrates one embodiment of an authorization with tip transaction. A restaurant patron (i.e., payer) wishes to pay her bill using a payment application on her mobile phone. The payment application is configured to interface with PPC 115 via PPC 115's REST API. Payer selects a "PayWith" button on her mobile device and is presented with a plurality of methods of payment. Payer selects a payment card from list of choices, enters an amount and taps send. A payer request is sent to the PPC 115. PPC 115 responds with a cloud transaction ID. Payer taps "View" to view the transaction as a barcode. Payee (i.e., the restaurant) scans the barcode and payee software submits a payee payment request, specifying a transaction type "restaurant," to PPC 115. PPC 115 matches both parts of the transaction and validates them. PPC 115 sends an authorization request to the issuer (e.g., via payment processing network 160) and receives an approval. PPC 115 responds to payee's payment authorization request with the approval pending update. PPC 115 updates the cloud transaction record (e.g. updates a record on CSD 150) with an indication that an update is expected. PPC 115 sends payer a message indicating that a tip (or gratuity) is expected. Payer enters a tip amount and submits it, via the payer's mobile, to PPC 115. PPC 115 sends a message to payee that the transaction was updated and the payee device fetches the updated information (in this case the tip). In an embodiment, PPC 115 automatically sends the updated information to the payee device. PPC 115 sends payer's device a notification of payee's update to transaction (e.g., the receipt).

When an "authorization and settlement" transaction is processed by PPC 115, PPC 115 provides authorization to the payee and captures the transaction for settlement on behalf of payee. In an "authorization, tip and settlement" transaction, PPC 115 presents the transaction on the payer device to allow the payer to add a tip before submitting payment network for authorization. In an embodiment, PPC 115 interfaces with existing payment networks and works alongside existing settlement processes. In an embodiment, the settlement process is enabled as a service by PPC 115.

In a "peer to peer funds transfer", PPC 115 coordinates a transfer of funds from one financial account to another. The following example illustrates one embodiment of peer to peer funds transfer transaction. Payer and payee register with EPC 115 and have payment cloud accounts set up with payment accounts associated with the payment cloud accounts. Payer can identify a payee account using payee's phone number. Payer submits a payment request via, for example, a mobile phone app configured to submit transactions via EPC 115's API. Payer enters an amount to be paid to the payee and submits the payment request. EPC 115 receives the request. EPC 115 creates a cloud transaction identifier and sends a message comprising the cloud transaction identifier to the payer. In an embodiment, the cloud transaction ID is sent via a token. The payer receives the cloud transaction ID and the payer device presents the option to share it with a payee. The payer sends the cloud transaction ID to the payee. In one embodiment, payer sends to payee via a short message service (SMS) message, an email message or a multimedia message service (MMS) message. Payer may send to payee by placing the payer device in close proximity with a payee device. Payee receives the cloud transaction ID and sends a payer request to EPC 115. EPC 115 determines that sufficient funds exist in the payee account identified by the payee and sends a message to the payee that the transaction was approved. In an embodiment, EPC 115 also sends a message to the payer indicating the successful transaction. In an embodiment, payer mobile device is configured (e.g., using an installed app) to automatically poll for notifications from EPC 115.

In an embodiment, EPC 115 enables canceling by the payer a requested payment. EPC 115 receives a cancel or "delete" request from a payee. EPC 115 searches for and identifies the cloud transaction associated with the delete request. EPC 115 effectively deletes the cloud transaction. In an embodiment, for data integrity and audit purposes, the cloud transaction is not actually deleted from the database, but data associated with the transaction is updated, such that any authorization associated with the transaction is expired and/or de-authorized.

In an embodiment, EPC 115 makes use of proxy or "alias" account codes as either the cloud account code and/or to identify a user transaction account within the cloud. A proxy code does not include any (or may include minimal) sensitive information about a user or transaction account. In other words, certain information (e.g., the user's actual account number) is not transmitted to payer and payee devices. The use of proxy codes in a financial transaction is disclosed in detail in U.S. Pat. No. 7,543,738 entitled "System And Method For Secure Transactions Manageable By A Transaction Account Provider," issued on Jun. 9, 2009, which is hereby incorporated by reference in its entirety.

In an embodiment, cloud transaction identifiers are limited use identifiers associated with a use restriction. For example, in addition to the use may be limited to a particular payee, type of product, merchant location, transaction amount, timeframe, etc. For more information regarding transactions that involve limited use identifiers and use restrictions see, for example, U.S. Pat. No. 7,627,531, entitled "System For Facilitating a Transaction," issued on Dec. 1, 2009 and U.S. Pat. No. 7,472,827, entitled "Limited Use Pin System And Method," issued on Jan. 6, 2009, both of which are hereby incorporated by reference in their entireties.

In various embodiments, a payee can pass the cloud transaction ID and/or cloud transaction token, via a variety of mechanisms. In existing retail stores, existing point of service (POS) scanners may scan information from a payer device. For example, the payer may receive the cloud transaction ID as data encode the data into a barcode (e.g. a UPA-A, two dimensional or UPC bar code). The Payer's device application encodes the transaction ID as a barcode and displays it on the device screen that can be read by the POS barcode scanner. The retail store computer decodes the barcode and creates a payee payment request with the cloud transaction ID and the merchant and transaction details and sends it to EPC 115. This enables existing stores to use existing infrastructure to create and process Payment Cloud payments without changing POS terminals.

In an embodiment, PPC 115 also enables automated audit of the payment transactions. For example, PPC 115 performs an automated audit of settlement requests, merchant payments, a budget associated with a cloud account, etc.

In one embodiment, a cloud user account includes membership accounts. PPC 115 may provide incentives to conduct transactions, or perform other activities via the cloud infrastructure. The incentives may include one or more of a lower Annual Percentage Rate (APR) on a transaction account, a discount on the finance charges, a rebate on finance charges, a cash bonus, a cash-back amount, membership reward points, reduced renewal fees, achievement credit toward a future incentive, increased credit line, increased spend line, statement credit, gift vouchers, gifts, special privileges, special access passes (e.g., back-stage pass). The incentives may be selected using a tiered incentive model. In one embodiment, a discount is a reduction in the amount of finance charges accrued (or fees assessed) on the transaction account. A rebate may be a refund and/or credit of a portion of finance charges accrued (or fees assessed) on a transaction account. For example, a rebate may be sent to a customer (or credited to a customer account) several months after criteria for an incentive have been satisfied.

PPC 115 may enable commercial transactions involving the exchange of monetary value for goods, services, or other value between remote individuals, such as users of a distributed computer network or Internet users. The present disclosure also provides remote purchasers with means for making a secure, confidential transfer of funds; means for immediate initiation of shipment by a seller; means for releasing funds to a seller only after approval of the goods, services, or other value received from the seller; means for demonstrating proof of payment; and means for having some level of recourse against a remote seller. More particularly, the disclosure facilitates commercial transactions by suitably coordinating the transfer of financial tender from a financial account associated with a first party to a financial account associated with a second party. Additional details are disclosed in U.S. application Ser. No. 12/242,759 entitled "Systems And Methods For Facilitating Transactions" and filed on Sep. 30, 2008, which is hereby incorporated by reference in its entirety.

Users of PPC 115 may earn loyalty points, redeem loyalty points, receive advanced loyalty points and/or receive a cash advance associated with loyalty points. In various embodiments, loyalty accounts may be associated with executing a transaction or using a preferred service provider.

PPC 115 may be configured to execute a method for facilitating earning loyalty points. The loyalty points may be associated with a geographic area, and the method includes: receiving purchase data; determining a geographic area related to the purchase data; determining an amount of geographic area loyalty points based on the geographic area information and purchase data; and updating the loyalty account with the geographic area loyalty points. Receiving purchase data may include: receiving and storing manufacturer item identifiers; receiving and processing a consumer ID; receiving and processing purchase data, wherein the purchase data comprises a retailer item identifier; associating at least two of consumer ID, purchase data, and a manufacturer item identifier; and performing an analysis that is dependent upon the step of associating.

PPC 115 also facilitates redeeming loyalty points, wherein the loyalty points are associated with a geographic area, by maintaining a database for storing geographic area loyalty points in a loyalty account corresponding to a participant; receiving a request related to a requested geographic redemption area to redeem an amount of the geographic area loyalty points; determining if the requested geographic redemption area is associated with the geographic area loyalty points; and, adjusting the loyalty account based upon the amount of geographic area loyalty points.

In one embodiment, an account participant is issued a number of advanced loyalty points to facilitate a purchase when a loyalty account balance is not sufficient to complete such a transaction. Using a number of preset rules and criteria, an account manger calculates a number of points available to an account participant as an advance. According to this point advance embodiment, the account participant may subsequently utilize the advanced loyalty points to purchase goods and/or services from the account manger or any merchant that accepts the loyalty points. The user is allotted a period of time for which to earn enough loyalty points to offset the loyalty point advances. If, at the end of the allotted period of time, a balance of advanced loyalty points has not been offset, then the account manager may charge the participant an amount equal to the currency value of the loyalty points at the time of the advance. In one embodiment, to determine the number of loyalty points available for advance, account manager may consider consumer information (e.g., participant and financial account attributes). These attributes may include, for example, the participant's account history, other parties responsible for the participant's account, the length of time the participant has been enrolled in the loyalty program, the product type associated with the loyalty account, the intended use of the points, and/or the like. For example, participants may be classified into tiers according to the type of financial instrument associated with the loyalty account. The available points for advance may also change depending on how quickly a previous advance is replenished, or the available advance points may increase as each previously advanced point is replenished. Practitioners will appreciate that the calculation of loyalty points available for advance may be based on any number of characteristics and variables.

Thus, a loyalty point transaction may include a participant desiring to apply loyalty points to facilitate a particular transaction over PPC 115. The user may (1) use his or her charge card number to make an online purchase, (2) associate the charge card account with a loyalty account; and (3) invoke a process to apply a currency value credit (corresponding to a defined amount of loyalty points) to the participant's designated transaction account. This currency value credit may offset all or part of a corresponding purchase. Therefore, loyalty points are not used to make the purchase, but may be used to offset at least part of a corresponding charge. The integration of the loyalty program and PPC 115 is undetectable to the merchant in that the merchant may be unaware that the customer is using loyalty points to offset at least part of the charge. Additional embodiments relate to the crediting of a variety of different accounts to facilitate particular transactions. For more information regarding loyalty points and loyalty point advance features, see U.S. application Ser. No. 11/548,203, entitled "System And Method For Issuing And Using A Loyalty Point Advance" and filed on Oct. 10, 2006 which hereby incorporated by reference in its entirety.

In one embodiment, a transaction processed by PPC 115 is associated with a loyalty point advance or a loyalty point cash conversion. PPC 115 receives a request from a consumer to exchange loyalty points for a purchase of an item. The system issues a loyalty point advance to the loyalty account of the consumer to facilitate the purchase. In one embodiment, the system may determine a time period during which the consumer may earn loyalty points to offset the loyalty point advance. In one embodiment, PPC 115 charges a transaction account associated with the consumer for the amount of the purchase minus the cash value associated with the loyalty point advance.

In an embodiment, PPC 115 may offer a savings program to its members which creates discounts on transactions at specific, program-enrolled merchants and/or based upon consumer spending. In one embodiment, PPC 115 enables systematic and automatic discount to consumers when they use PPC 115 for the transaction.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:
1. A method comprising:
receiving, by a computer for enabling payment processing and from a payer device, a payer request, wherein the payer request comprises a payer account identifier associated with a first payer, and wherein the computer is part of an Internet accessible payment processing cloud;

saving, by the computer and to a memory associated with the payment processing cloud, a first cloud transaction comprising a cloud transaction identifier based upon the payer request;

identifying, by the computer and based upon a payer profile associated with the cloud and the payer request, an alternate payer device, sending, by the computer, the cloud transaction identifier to the alternate payer device;

receiving, by the computer and from a payee device, a payee payment request comprising the cloud transaction identifier, wherein the payee payment request comprises a payee account identifier associated with a first payee;

identifying, by the computer and based upon the cloud transaction identifier, the first cloud transaction;

submitting, by the computer, a transaction authorization request to a payment network;

receiving, by the computer and based upon the transaction authorization request, a transaction authorization from the payment network; and sending, by the computer and based upon the transaction authorization, a first notification message to the payee.

2. The method of claim 1, further comprising registering a plurality of payers and a plurality of payees.

3. The method of claim 1, further comprising receiving a get information request from a requesting device associated with at least one of the first payer and a first payee.

4. The method of claim 3, further comprising determining transaction details based upon the get information request and sending an update comprising a subset of the transaction details, to the requesting device.

5. The method of claim 4, wherein the update comprises a receipt associated with the financial transaction.

6. The method of claim 4, wherein the update comprises a request to specify a gratuity amount associated with the cloud transaction.

7. The method of claim 6, further comprising receiving a gratuity message from the first payer and sending a second notification message to the first payee.

8. The method of claim 1, further comprising:
receiving a delete request from the first payee;
searching the memory based upon the delete request in order to identify the cloud transaction; and
at least one of deleting the cloud transaction and updating the cloud transaction to de-authorize the cloud transaction.

9. The method of claim 8, wherein the first notification message to the payee informs the payee that the cloud transaction has been cancelled, and wherein the computer does not execute the submitting the transaction authorization request to the payment network.

10. The method of claim 1, further comprising receiving an update information request comprising additional information from at least one of the first payer and the first payee and updating the cloud transaction with the additional information.

11. The method of claim 1, wherein the payment processing cloud comprises an application programming interface (API) specifying application interface with the payment processing cloud.

12. The method of claim 11, wherein at least one of the payer request, the payee payment request, an update information request, a gratuity message, a get information request, a delete request and the transaction authorization request conform to the API.

13. The method of claim 11, wherein the API conforms to representational state transfer ("REST") constraints.

14. The method of claim 11, wherein the API comprises a plurality of services each associated with a unique uniform resource locator.

15. The method of claim 11, wherein the API enables sending and receiving via at least one of the Internet, HTTP, XML, short message service (SMS), multimedia message service (MMS), a web application, mobile web application and a micro application.

16. The method of claim 1, further comprising determining a financial transaction account identifier based upon the payee account identifier.

17. The method of claim 16, wherein the transaction authorization request comprises the financial transaction account identifier.

18. The method of claim 1, wherein the payee payment request comprises at least one of user authentication data, a payment amount, a payment currency, a geographical location, a notification option, and a developers API key.

19. The method of claim 1, wherein the payer request comprises at least one of user authentication data, a settlement account identifier, a transaction type, a payment amount, a payment currency, a developers API key and transaction details.

20. The method of claim 1, further comprising updating the cloud transaction based upon the transaction authorization.

21. The method of claim 1, wherein the payment network comprises at least one of American Express, VisaNet and Maestro.

22. The method of claim 1, the identifying the alternate payer device is further based upon the payee account identifier.

23. The method of claim 1, wherein the payee device obtains the cloud transaction identifier from the payer device.

24. A payment processing cloud comprising:
a network interface communicating with a memory;
the memory communicating with a processor for processing financial transactions; and
the processor, when executing a computer program, performs operations comprising:
receiving, by the processor and from a payer device, a payer request, wherein the payer request comprises a payer account identifier associated with a first payer, and wherein the processor is part of an Internet accessible payment processing cloud;
saving, by the processor and to a memory associated with the payment processing cloud, a first cloud transaction comprising a cloud transaction identifier based upon the payee payment request;
identifying, by the processor and based upon a payer profile associated with the cloud, an alternate payer device,
sending, by the processor, the cloud transaction identifier to the alternate payer device; receiving, by the processor and from a payee device, a payee payment request comprising the cloud transaction identifier, wherein the payee payment request comprises a payee account identifier associated with a first payee;
identifying, by the processor and based upon the cloud transaction identifier, first cloud transaction;
submitting, by the processor, a transaction authorization request to a payment network;
receiving, by the processor and based upon the transaction authorization request, a transaction authorization from the payment network; and
sending, by the processor and based upon the transaction authorization, a first notification message to the payee.

25. A non-transitory computer-readable storage medium having computer-executable instructions stored thereon that, if executed by cloud-based payment processing computer, causes the computer to perform operations, comprising:
- receiving, by the computer and from a payer device, a payer request, wherein the payer request comprises a payer account identifier associated with a first payer, and wherein the computer is part of an Internet accessible payment processing cloud;
- saving, by the computer and to a memory associated with the payment processing cloud, a first cloud transaction comprising a cloud transaction identifier based upon the payee payment request;
- identifying, by the computer and based upon a payer profile associated with the cloud, an alternate payer device,
- sending, by the computer, the cloud transaction identifier to the alternate payer device;
- receiving, by the computer and from a payee device, a payee payment request comprising the cloud transaction identifier, wherein the payee payment request comprises a payee account identifier associated with a first payee;
- identifying, by the computer and based upon the cloud transaction identifier, first cloud transaction;
- submitting, by the computer, a transaction authorization request to a payment network;
- receiving, by the computer and based upon the transaction authorization request, a transaction authorization from the payment network; and
- sending, by the computer and based upon the transaction authorization, a first notification message to the payee.

* * * * *